3,151,110
ALCOHOLATES OF 3-AMINO-6-SUBSTITUTED-1,2,4-TRIAZINE COMPOUNDS
Yutaka Kodama, Isamu Saikawa, Akira Takai, and Mizuho Haseda, all of Toyama-shi, Japan, assignors to Toyama Kagaku Kogyo Kabushiki Kaisha, Tokyo, Japan, a corporation of Japan
No Drawing. Filed Nov. 15, 1961, Ser. No. 152,635
Claims priority, application Japan July 17, 1961
7 Claims. (Cl. 260—240)

This invention relates to new 3-amino-1,2,4-triazine compounds having the structures represented by the following formula:

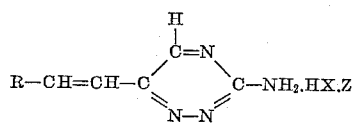
(I)

where R is selected from the group consisting of nitrofuryl, nitrothienyl and nitrophenyl, X is the anion of an acid and Z is an alcohol.

In the copending applications of Kodama, Takai, Saikawa, Maeda, and Takamichi, Serial No. 152,632, filed November 15, 1961, Kodama, Saikawa, Maeda and Hirai, Serial No. 152,634, filed November 15, 1961, there have been described and claimed 3-amino-6-(5' - nitrofurylethenyl)-1,2,4-triazine, 3-amino-6-(5' - nitrothienylethenyl)-1,2,4-triazine, and 3-amino-6-p-nitrostyryl-1,2,4-triazine, their salts and hydrates. These compound constitute the raw material with which the present invention starts. It is not known with complete certainty just where the elements of alcohol are introduced into the molecule. They may be introduced at the 4- and 5-positions in which case the compounds are dihydroalkoxy triazines, or they may be otherwise attached to the molecule, for example as a solvate. It is not intended to limit the present invention to the location of the elements of the alcohol. The compounds will therefore be referred to as alcoholates.

Essentially, the present invention reacts either the triazine, its monohydrate or salts thereof with an excess of an alcohol in the presence of an inorganic acid. This transforms the compound into a monoalcoholate. The alcoholates of the present invention have high antibacterial activity. For example, the methanolate shows the following minimum growth inhibitory concentration against a number of organisms:

| Organism: | Concentration, p.p.m. |
|---|---|
| Escherichia coli | 22 |
| Bacillus typhi | 10 |
| Escherichia dysentariae | 10 |
| Staphylococcus aureus | 4 |
| Salt-tolerant strain | 80 |
| Black mould | 2.5 |

In addition to the effectiveness as antibacterials, the alcoholates of the present invention permit preparation of unhydrated 1,2,4-triazine compounds by a new route in which the alcoholates of the present invention, when heated or reacted with alkali, convert to the unhydrated triazine. Where the latter is desired, the present invention presents an alternate and for some purposes advantageous route to obtain the pure unhydrated triazine. This process aspect of the invention is also included.

The invention will be described in greater detail in conjunction with the specific examples in which the parts are by weight unless otherwise specified.

*Example 1*

8 parts of bis-(5-nitrofurfurylidene)-acetone guanyl hydrazone sulfate are suspended in 100 parts of dimethylformamide. The suspension is heated at 100–130° C. until solution takes place. After cooling this solution, ammonia is introduced in excess over that required to neutralize the salt and the mixture is then again heated at 130–140° C. until reaction is complete. The mixture is cooled, poured into 300 parts of hydrochloric acid with good stirring, and then filtered. The filtrate is then made alkaline with ammonia and cooled until the resulting free base precipitates out. It is recovered by filtration and is purified by recrystallization from a mixture of isopropyl alcohol and methylethyl ketone. A reddish-orange colored crystalline powder is obtained which does not have a sharp melting point but decomposes at approximately 269° C. Analysis corresponds to the hydrate of 3-amino-6-(5'-nitrofurylethenyl)-1,2,4-triazine.

*Example 2*

20 parts of bis-(5-nitrofurfurylidene)-acetone guanyl hydrazone is dissolved in 200 parts of dimethylformamide with stirring and 28 parts of sodium carbonate are then added which is far in excess of that sufficient to bring the pH above 4.0. The mixture is then heated at 120–130° C. until reaction is complete, at which time the reaction mixture is strongly alkaline.

The reaction mixture is distilled under a vacuum to remove dimethylformamide. It is then heated with 1,000 parts of acetone under reflux. The resulting solution is decolorized with carbon and subjected to hot filtration. After cooling the filtrate, crystalline reddish-orange colored powder separates out and is the unhydrated base, 3-amino-6-(5-nitrofurylethenyl)-1,2,4-triazine.

*Example 3*

Two parts of bis-(5-nitrothenylidene)-acetone guanyl hydrazone, 0.25 part of sodium carbonate, and 20 parts of dimethylformamide are heated at 130° C. until the reaction is complete. The mixture is then acidified with hydrochloric acid and diluted with 60 parts of water. Some black, undissolved material is removed by filtration and the filtrate is neutralized with a sodium carbonate solution. A reddish-orange colored base separates out and is purified by recrystallization from acetone. It corresponds to 3-amino-6-(5'-nitrothienylethenyl)-1,2,4-triazine.

*Example 4*

25 parts of bis-(p-nitrobenzylidene)-acetone guanyl hydrazone hydrochloride, 0.65 part of sodium bicarbonate and 20 parts of dimethylformamide is heated at 130° C. until the reaction is complete. The mixture is then diluted with 50 parts of water and acidified with hydrochloric acid. The mixture is filtered and the filtrate made alkaline with ammonia and again filtered. The crystalline mass collected is washed well with ether and methanol to remove any para-nitrotoluene produced. Then it is recrystallized from dimethylformamide to form yellow-orange colored crystalline needles, decomposing at about 305° C. This corresponds to 3-amino-6-(p-nitrostyryl)-1,2,4-triazine. The yield was essentially quantitative.

*Example 5*

25 parts of 3-amino-6-(5'-nitrofurylethenyl)-1,2,4-triazine are suspended in 25 parts of methanol. To the suspension a solution of 1.4 parts of oxalic acid in 15 parts of methanol is added. The mixture is warmed on a water bath to effect complete solution and then the solution is allowed to cool until a yellow crystalline mass separates out. This product is the methanolate of the 3-aminotriazine oxalate and decomposes at 153° C.

The procedure is repeated with various alcohols and acids forming the products shown in the following table:

| Alcohol | Acid | Decomposition Point, °C. |
|---|---|---|
| Methyl | Hydrochloric acid | 241 |
| Do | Hydrobromic acid | 168 |
| Do | Nitric acid | 156 |
| Do | Oxalic acid | 153 |
| Ethyl | Hydrochloric acid | 245 |
| Do | Hydrobromic acid | 175 |
| Isopropyl | ----do---- | 225 |
| Butyl | ----do---- | 191 |
| Allyl | ----do---- | 179 |

*Example 6*

25 parts of 3-amino-6-(5'-nitrofurylethenyl)-1,2,4-triazine are suspended in 25 parts of methanol and 8 parts of 20% methanolic hydrobromic acid added. Solution occurs gradually and after complete solution results, the mixture is filtered and the filtrate evaporated to half volume. On standing, yellow crystals separate out and are purified by recrystallizing from methanol. This product is the methanolate of 3-amino-6-(5'-nitrofurylethenyl)-1,2,4-triazine hydrobromide.

*Example 7*

Three parts of the methanolate hydrochloride of Example 5 are dissolved in 100 parts of water and 10 parts of a 5% aqueous sodium carbonate solution added. Reaction proceeds smoothly and a base separates out. This base is then purified by recrystallization from ethylene glycol monoethyl ether and results in yellowish-orange needles decomposing at about 269° C., which corresponds to unhydrated 3-amino-6-(5'-nitrofurylethenyl)-1,2,4-triazine.

*Example 8*

3.3 parts of the hydrate of 3-amino-6-(5'-nitrofurylethenyl)-1,2,4-triazine hydrobromide are suspended in 40 parts of methanol. This suspension is boiled on a water bath until crystalline solids gradually disappear. After the solution is complete, it is allowed to cool and the methanolate hydrobromide is obtained in yellow needles, which is identical with the corresponding product obtained from Example 5.

*Example 9*

3.3 parts of the methanolate nitrate prepared by the procedure of Example 5 is dissolved in 60 parts of an aqueous solution containing 1 part of nitric acid. This mixture is heated and then allowed to cool. The nitrate of the hydrate of the triazine separates out as yellow needles decomposing at 163 to 164° C. It should be noted that the removal of the elements of alcohol to produce an unhydrated triazine occurs only in a process in which the reaction is alkaline.

*Example 10*

By following the procedure of Example 5, and using 3-amino-6-(5'-nitrothienylethenyl)-1,2,4-triazine as starting material with methanol and hydrochloric acid, the corresponding methanolate of the hydrochloride is obtained.

*Example 11*

By following the procedure of Example 5 and using 3-amino-6-(p-nitrostyryl)-1,2,4-triazine as starting material with ethanol and hydrobromic acid, the corresponding ethanolate of the hydrobromide is obtained.

We claim:

1. A lower alkanolate of an addition salt of a physiologically acceptable acid of a compound of the formula:

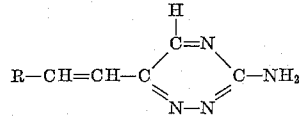

where R is selected from the group consisting of nitrofuryl, nitrothienyl and nitrophenyl, when prepared by reacting a compound of the above formula with a lower alkanol in the presence of a physiologically acceptable acid until the alkanolate of the acid addition salt is formed.

2. A compound according to claim 1 in which R is 5-nitrofuryl.

3. A compound according to claim 1 in which R is 5-nitrothienyl.

4. A compound according to claim 1 in which R is p-nitrophenyl.

5. A compound according to claim 2 in which the lower alkanol is methanol.

6. A compound according to claim 2 in which the lower alkanol is ethanol.

7. A lower allylate of an addition salt of a physiologically acceptable acid of a compound of the formula:

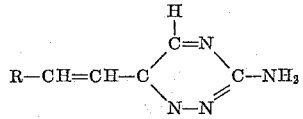

where R is selected from the group consisting of nitrofuryl, nitrothienyl and nitrophenyl, when prepared by reacting a compound of the above formula with allyl alcohol in the presence of a physiologically acceptable acid until the allylate of the acid addition salt is formed.

References Cited in the file of this patent

Dann et al.: Chemische Berichte, volume 82, pages 81–88 (1949).

Miura et al.: "Journ. Pharm. Soc. of Japan, volume 81, No. 9, pages 1357–60 and 1372–74 (1961).